(12) United States Patent
Sidelkovskiy et al.

(10) Patent No.: US 11,994,089 B2
(45) Date of Patent: May 28, 2024

(54) AFTER-FAN SYSTEM FOR A GAS TURBINE ENGINE

(71) Applicant: United Technologies Corporation, Farmington, CT (US)

(72) Inventors: Dmitriy B. Sidelkovskiy, Ellington, CT (US); Pitchaiah Vijay Chakka, Avon, CT (US); Michael Winter, New Haven, CT (US); Daniel Bernard Kupratis, Wallingford, CT (US)

(73) Assignee: RTX Corporation, Farmington, CT (US)

( * ) Notice: Subject to any disclaimer, the term of this patent is extended or adjusted under 35 U.S.C. 154(b) by 319 days.

(21) Appl. No.: 16/837,143

(22) Filed: Apr. 1, 2020

(65) Prior Publication Data

US 2020/0325852 A1 Oct. 15, 2020

Related U.S. Application Data

(60) Provisional application No. 62/831,953, filed on Apr. 10, 2019.

(51) Int. Cl.
*F02K 3/06* (2006.01)
*F04D 29/32* (2006.01)
(Continued)

(52) U.S. Cl.
CPC .............. *F02K 3/06* (2013.01); *F04D 29/323* (2013.01); *F01D 17/162* (2013.01); *F02C 7/36* (2013.01);
(Continued)

(58) Field of Classification Search
None
See application file for complete search history.

(56) References Cited

U.S. PATENT DOCUMENTS 4,055,042 A * 10/1977 Colley ...................... F02K 3/06
415/77
4,222,233 A * 9/1980 Johnson .................. F02K 3/025
60/761
(Continued)

FOREIGN PATENT DOCUMENTS

| EP | 0022692 A1 | 1/1981 |
| EP | 2587026 A2 | 5/2013 |

(Continued)

OTHER PUBLICATIONS

EP Search Report dated Aug. 18, 2020 issued for corresponding European Patent Application No. 20168376.0.

*Primary Examiner* — Gerald L Sung
*Assistant Examiner* — Jacek Lisowski
(74) *Attorney, Agent, or Firm* — Bachman & LaPointe, P.C.

(57) ABSTRACT

An after-fan system for a gas turbine engine includes a variable pitch fan exit guide vane array. An after-fan turbine downstream of the variable pitch fan exit guide vane array and a control operable to vary a pitch of the variable fan exit guide vane array. A method of generating thrust for a gas turbine engine includes rotating a fan section with an array of fan blades; rotating an after-fan turbine downstream of the fan section; and varying a pitch of a variable fan exit guide vane array downstream of the fan section and upstream of the after-fan turbine.

20 Claims, 11 Drawing Sheets

(51) Int. Cl.
*F01D 17/16* (2006.01)
*F02C 7/36* (2006.01)

(52) U.S. Cl.
CPC .... *F05D 2220/323* (2013.01); *F05D 2220/36* (2013.01); *F05D 2240/12* (2013.01); *F05D 2240/35* (2013.01); *F05D 2260/40311* (2013.01); *F05D 2260/74* (2013.01); *F05D 2260/79* (2013.01)

(56) References Cited

U.S. PATENT DOCUMENTS

| | | | |
|---|---|---|---|
| 4,376,375 | A | 3/1983 | Boudigues |
| 5,261,227 | A | 11/1993 | Giffin, III |
| 7,614,210 | B2 | 11/2009 | Powell et al. |
| 8,777,554 | B2 * | 7/2014 | Baughman ............... F02K 3/06 60/226.3 |
| 8,935,923 | B2 | 1/2015 | Kupratis |
| 2009/0145106 | A1 | 6/2009 | Keogh |
| 2011/0146228 | A1 * | 6/2011 | Baughman ............... F02K 3/077 60/224 |
| 2011/0146289 | A1 * | 6/2011 | Baughman ............... F02K 3/065 415/1 |
| 2011/0167792 | A1 | 7/2011 | Johnson et al. |
| 2013/0004297 | A1 * | 1/2013 | Sheridan ................... F02K 3/04 415/122.1 |
| 2013/0104522 | A1 * | 5/2013 | Kupratis ................... F02C 9/52 60/226.3 |
| 2016/0347463 | A1 | 12/2016 | Negulescu |
| 2018/0328288 | A1 | 11/2018 | Lemarchand et al. |
| 2020/0025070 | A1 | 1/2020 | Kupratis |

FOREIGN PATENT DOCUMENTS

| | | |
|---|---|---|
| WO | 2011038216 A1 | 3/2011 |
| WO | 2014152875 A1 | 9/2014 |

* cited by examiner

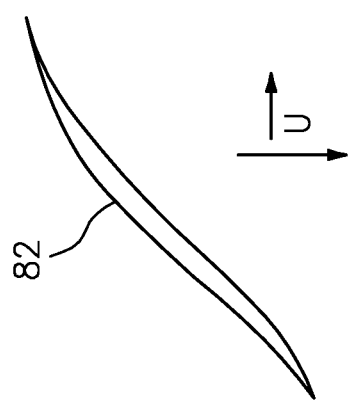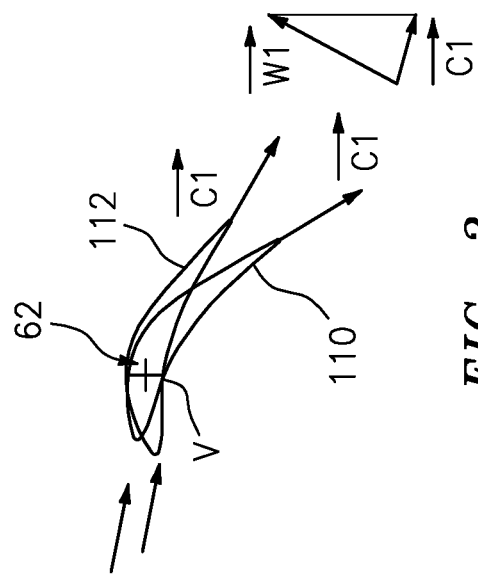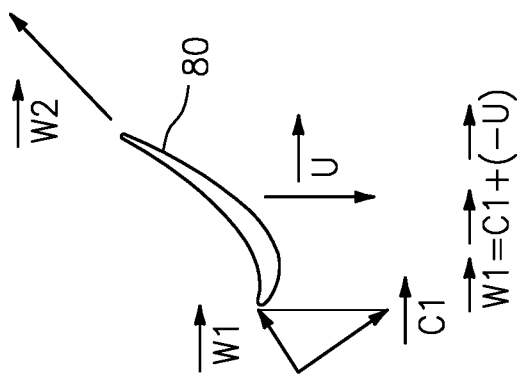
FIG. 3
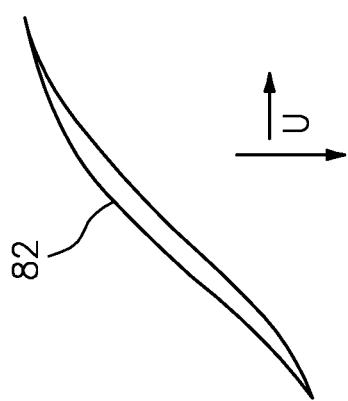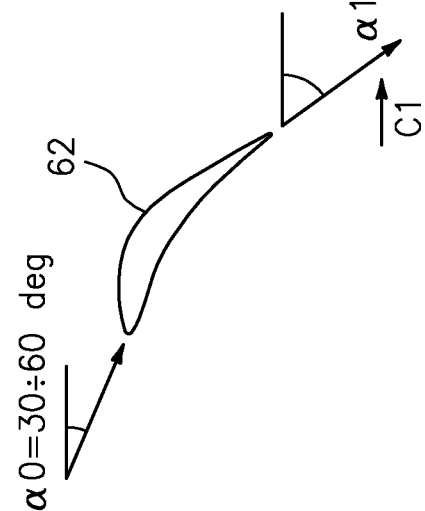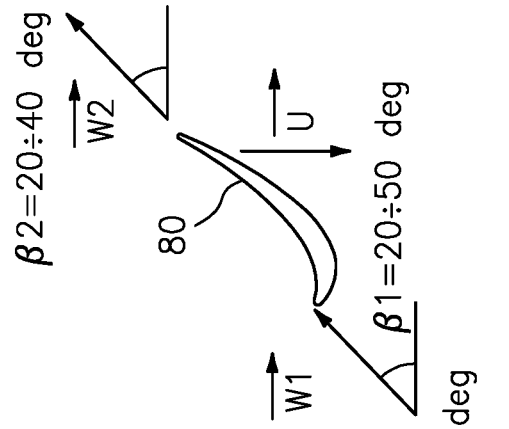
FIG. 4

AFTER-FAN SYSTEM FOR A GAS TURBINE ENGINE

CROSS REFERENCE TO RELATED APPLICATION

This application claims the benefit of provisional application Ser. No. 62/831,953, filed Apr. 10, 2019.

BACKGROUND

The present disclosure relates to a gas turbine engine architecture, and more particularly, to a fan section with an after-fan system.

Gas turbine engines, such as those which power modern commercial and military aircraft, include a compressor section, combustor section and turbine section arranged longitudinally around the engine centerline so as to provide an annular gas flow path. The compressor section compresses incoming atmospheric gases that are then mixed with a combustible fuel product and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce bypass thrust. Downstream of the turbine section, a military engine may include an augmentor section, or "afterburner", that is operable to selectively increase the thrust. The increase in thrust is produced when fuel is injected into the core exhaust gases downstream of the turbine section and burned with the oxygen contained therein to generate a second combustion.

Aircraft engines are sized for a required flight thrust at the most critical conditions, such as top of climb, as well as take-off with one engine failed, or other aircraft flight thrust development margins. Thus, the engine is oversized for a cruise thrust conditions that increases engine/aircraft weight, performance, and fuel consumption penalty accordingly.

Typical Turbofan engines require a fan diameter increase to increase engine Bypass Ratio (BPR) for cruise propulsive efficiency and TSFC improvement, accordingly. Using traditional engine designing approaches, to increase required top of climb thrust for new generation engines with a low fan pressure ratio, the fan diameter would need to be increased by 45-50% vs. current engines. Such a fan diameter increase, however, requires an increase to engine core size and may increase engine/aircraft installation penalties which then limit TSFC improvement.

SUMMARY

An after-fan system for a gas turbine engine according to one disclosed non-limiting embodiment of the present disclosure includes a variable pitch fan exit guide vane array; an after-fan turbine downstream of the variable pitch fan exit guide vane array; and a control operable to vary a pitch of the variable fan exit guide vane array.

A further aspect of the present disclosure includes that the variable pitch fan exit guide vane array comprises a split variable pitch fan exit guide vane array.

A further aspect of the present disclosure includes that the split variable pitch fan exit guide vane array includes a first variable pitch fan exit guide vane array and a second variable pitch fan exit guide vane array inboard of the first variable pitch fan exit guide vane array.

A further aspect of the present disclosure includes that the first variable pitch fan exit guide vane array and the second variable pitch fan exit guide vane array are independently adjustable in pitch.

A further aspect of the present disclosure includes that the first variable pitch fan exit guide vane array and the second variable pitch fan exit guide vane array are separated by a splitter.

A further aspect of the present disclosure includes that the after-fan turbine is located within the splitter.

A further aspect of the present disclosure includes that the after-fan turbine is located downstream of the splitter.

A further aspect of the present disclosure includes that the variable pitch fan exit guide vane array is downstream of a fan section.

A further aspect of the present disclosure includes that the variable pitch fan exit guide vane array is downstream of a low pressure compressor section.

A gas turbine engine, according to one disclosed non-limiting embodiment of the present disclosure includes a fan section with an array of fan blades; a variable fan exit guide vane array downstream of the fan section; and an after-fan turbine downstream of the variable fan exit guide vane array.

A further aspect of the present disclosure includes that the variable pitch fan exit guide vane array is downstream of a low pressure compressor section which is downstream of the fan section.

A further aspect of the present disclosure includes that the after-fan turbine is driven in concert with the fan section.

A further aspect of the present disclosure includes that the after-fan turbine is driven by a geared architecture which also drives the fan section.

A further aspect of the present disclosure includes that the gas turbine engine is a high bypass gas turbine engine.

A further aspect of the present disclosure includes that the gas turbine engine is a low bypass gas turbine engine.

A further aspect of the present disclosure includes that the low bypass gas turbine engine is variable cycle.

A method of generating thrust for a gas turbine engine according to one disclosed non-limiting embodiment of the present disclosure includes rotating a fan section with an array of fan blades; rotating an after-fan turbine downstream of the fan section; and varying a pitch of a variable fan exit guide vane array downstream of the fan section and upstream of the after-fan turbine.

A further aspect of the present disclosure includes locating the variable fan exit guide vane array and the after-fan turbine downstream of a low pressure compressor section.

A further aspect of the present disclosure includes that varying the pitch of the variable fan exit guide vane array comprises independently varying a pitch of an outer diameter section of the variable fan exit guide vane array and an inner diameter section of the variable fan exit guide vane array.

A further aspect of the present disclosure includes further comprising locating a splitter between the outer diameter section of the variable fan exit guide vane array and the inner diameter section of the variable fan exit guide vane array.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 3 is a schematic illustration of an operational range of a variable guide vane array upstream of the after-fan turbine of the after-fan system.

FIG. 4 is a schematic illustration of an airflow angle range through the after-fan system.

DETAILED DESCRIPTION

Figure 1:
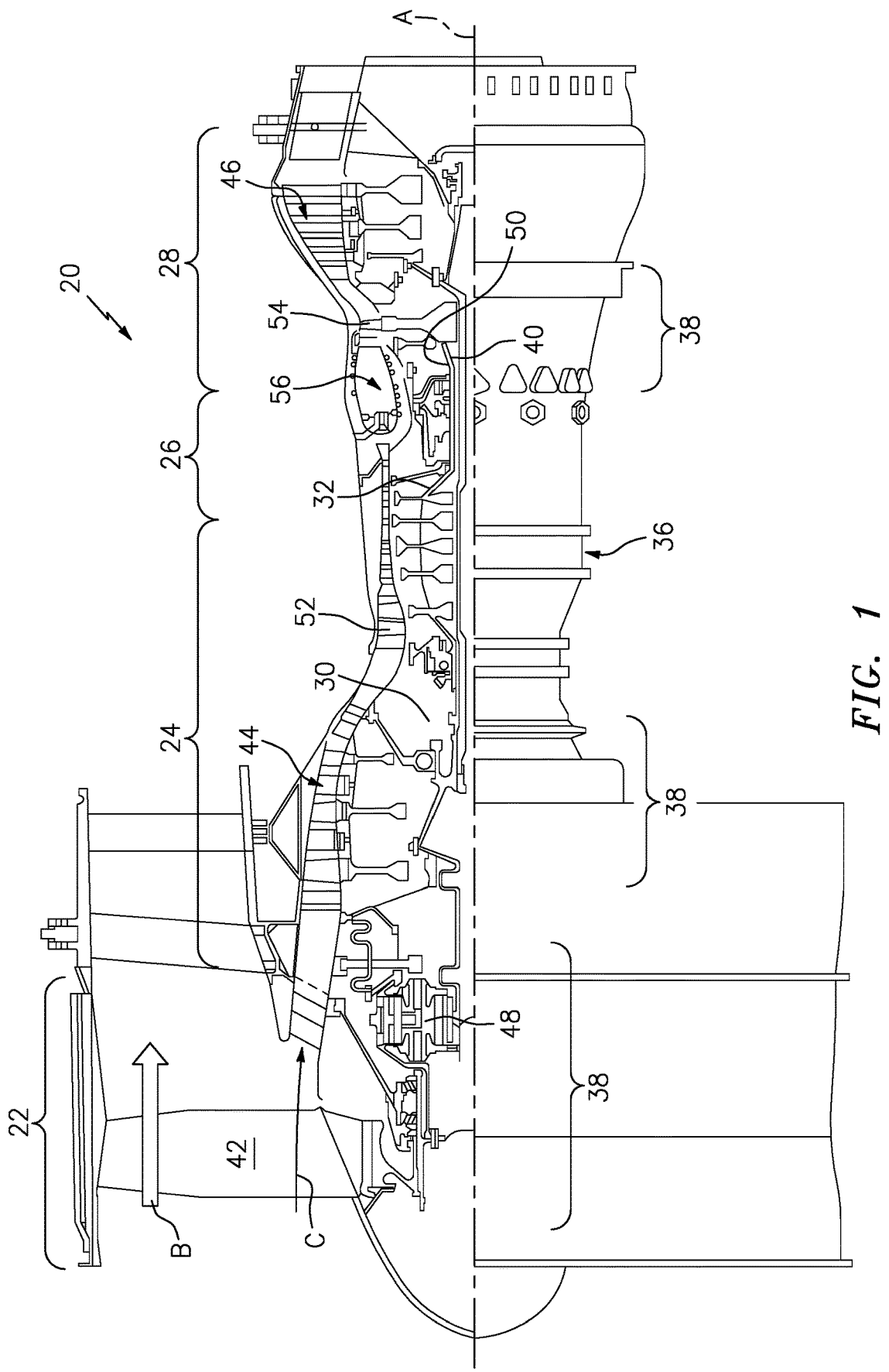
FIG. 1 is a schematic cross-section of an example high bypass gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flowpath B while the compressor section 24 drives air along a core flow combustion gas path C for compression and communication into the combustor section 26, then expansion through the turbine section 28. The fan, compressor, and turbine sections may include various architectures that, for example, include a multitude of stages, each with or without various combinations of variable or fixed guide vanes. The sections are defined along a central longitudinal engine axis A. Although depicted as a turbofan in the disclosed non-limiting embodiment, it should be appreciated that the concepts described herein may be applied to other engine architectures such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearings 38. The low spool 30 generally includes an inner shaft 40 that interconnects a fan section 42, a low pressure compressor ("LPC") 44 and a low pressure turbine ("LPT") 46. The inner shaft 40 drives the fan section 42 directly or through a geared architecture 48 that drives the fan section 42 at a lower speed than the low spool 30. An exemplary reduction transmission is an epicyclic transmission, such as a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46 which rotationally drive the respective high spool 32 and the low spool 30 in response to the expansion. The main engine shafts 40, 50 are supported at a plurality of points by bearings 38 within the static structure 36.

In one non-limiting embodiment, the gas turbine engine 20 is a high-bypass geared architecture engine in which the bypass ratio is greater than six (6:1). The geared architecture 48 can include an epicyclic gear train, such as a planetary gear system, star gear system or other gear system. The example epicyclic gear train has a gear reduction ratio of greater than 2.3, and in another example is greater than 2.5. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than ten (10:1), the fan diameter is significantly larger than that of the low pressure compressor 44, and the low pressure turbine 46 has a pressure ratio that is greater than five (5:1). It should be appreciated, however, that the above parameters are only exemplary of one embodiment of a geared architecture engine and that the present disclosure is applicable to other gas turbine engines including direct drive turbofans.

The high bypass ratio results in a significant amount of thrust. The fan section 22 of the gas turbine engine 20 is designed for a particular flight condition—typically cruise at 0.8 Mach and 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/518.7)$^{0.5}$. The Low Corrected Fan Tip Speed according to one non-limiting embodiment of the example gas turbine engine 20 is less than 1150 fps (351 m/s). The Low Corrected Fan Tip Speed in another non-limiting embodiment of the example gas turbine engine 20 is less than 1200 fps (366 m/s).

Figure 2:
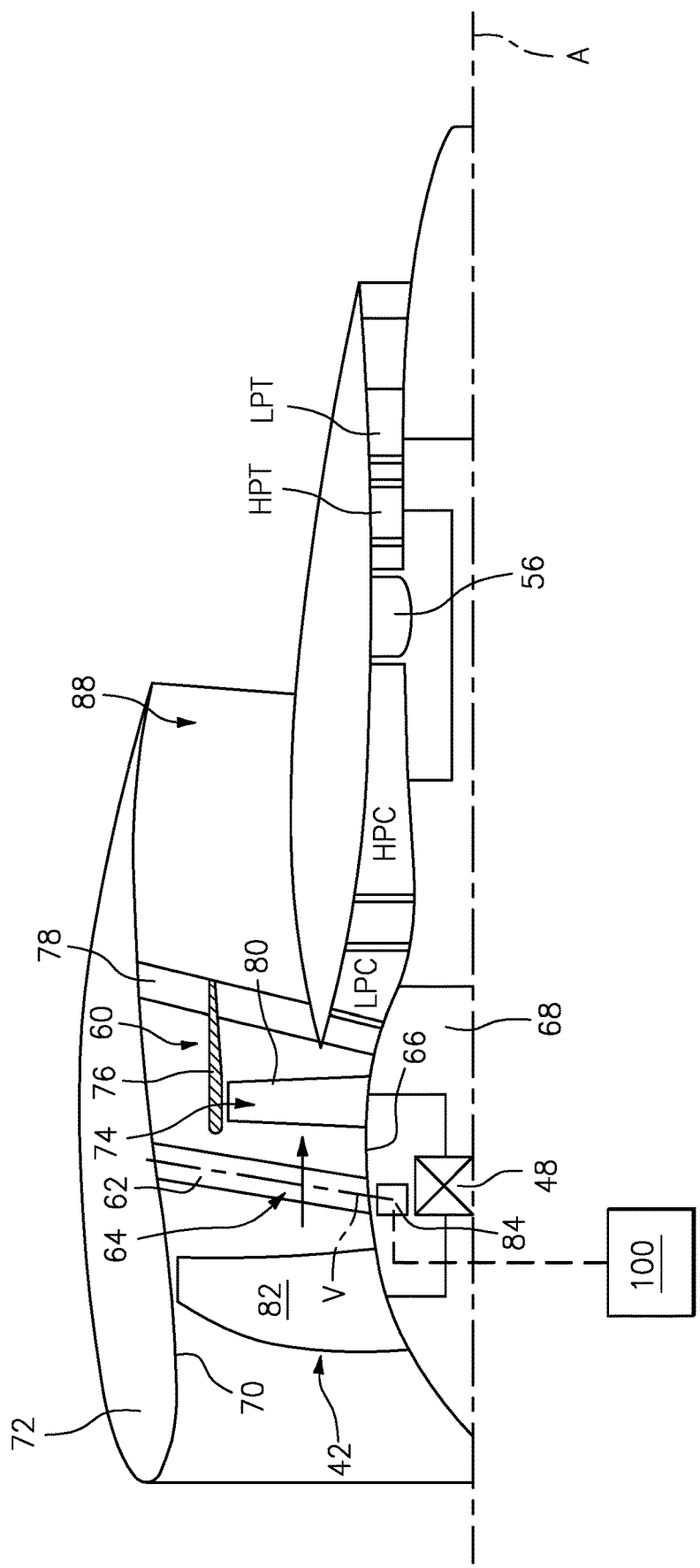
FIG. 2 is a schematic illustration of the high bypass gas turbine engine with an after-fan system according to one disclosed non-limiting embodiment.

With reference to FIG. 2, the fan section 22 includes an after-fan system 60 downstream of the fan section 42. The after-fan system 60 includes a variable pitch fan exit guide vane array 62 that form a variable pitch fan exit guide vane ring 64 transverse to the bypass flowpath between an outer profile 66 of a core static structure 68 and an inner periphery 70 of the fan nacelle 72. Downstream of the variable pitch fan exit guide vane ring 64, an after-fan turbine 74 is positioned between the outer profile 66 of the core static structure 68 and a ring splitter 76 located radially inboard of the inner periphery 70 of the fan nacelle 72. In this embodiment, the after-fan turbine 74 is a short span after-fan turbine 74 which is contained within the ring splitter 76. The ring splitter 76 may be at least partially supported by an array of struts 78 between the outer profile 66 of the core static structure 68 and the inner periphery 70 of the fan nacelle 72.

The after-fan turbine 74 rotates about the engine centerline axis A. The after-fan turbine 74 may be driven at speed related to the fan section 42 either directly or through the geared architecture 48. The after-fan turbine 74 extracts a portion of the energy from the compressed bypass flow from the fan section 42 and returns energy to the fan section 42 through torque. The after-fan turbine 74 includes after-fan turbine blades 80 that, in this embodiment, are of a span less than the fan blades 82 of the fan section 42. In one example, the after-fan turbine 74 is of a diameter between 50%-75% of the fan section 42. The stagger angles of the after-fan turbine blades 80 and fan blades 82 are the angle of the chord line connecting the tip of the airfoil shape to the trailing edge of the airfoil shape. Measured between the direction of the wheel speed, U, and the chord line, the stagger angles of the after-fan turbine blades 80 and fan blades 82 are substantially the same. The chord length of the fan blades 82 is substantially longer than the chord length of the after-fan turbine blades 80 due to the different aerodynamic loadings of the fan blades 82 versus the after-fan turbine blades 80. The relative velocity, W, of the flow passing over the fan blades 82 decelerates and creates a higher aerodynamic loading. The relative velocity, W, of the flow passing over after-fan turbine blades 80 accelerates from W1 to W2 and the aerodynamic loading is lower than the fan blades 82. The aerodynamic loading of the after-fan turbine blades 80 varies with the vane 62 angle, alpha1. Decreasing alpha1 increases the aerodynamic loading of the after-fan turbine blades 80.

A pitch angle of each of the variable pitch fan exit guide vane array 62 may be varied along a pitch axis V to change the pitch thereof in response to a controller 100 to modify the bypass airflow from the fan section 42 that is communicated into the after-fan turbine 74. The controller 100 generally may include a processor, a memory, and an interface. The processor may be any type of microprocessor having desired performance characteristics. The processor and the interface are communicatively coupled to the memory. The memory may be embodied as any type of computer memory device which stores data and control algorithms such as logic as described herein. The interface is communicatively coupled to a number of hardware, firmware, and/or software components, including sensors and actuators 84 for the variable pitch fan exit guide vane array 62. The controller 100 may, for example, be a portion of a flight control computer, a portion of a Full Authority Digital Engine Control (FADEC), a stand-alone unit or combinations thereof.

The variable pitch fan exit guide vane array 62 modifies the bypass airflow from the fan section 42 (FIG. 3) such that a bypass airflow entrance angle into the after-fan turbine 74 is selectively adjusted to change the energy extracted therefrom to, for example, maximize energy extraction at cruise, yet minimize energy extraction at the top of climb and take-off thrust conditions.

The variable pitch fan exit guide vane array 62 and the after-fan turbine 74 controls a fan operating line for efficiency and operability at the desired flight conditions. The after-fan turbine 74 optimizes fan duct nozzle 88 pressure ratio, and nozzle 88 exit airflow velocity, accordingly, to increase propulsive efficiency at different off-design flight conditions. The short span after-fan system 60 is of reduced weight and provides design flexibility to create an aerodynamically efficient after fan turbine 74 by design choices of rpm and diameter optimization for achieving engine thrust requirements.

To decrease engine specific fuel consumption (TSFC) engine propulsive efficiency is increased, which is associated with very low cruise fan pressure ratio of about 1.15, and a super high engine bypass ratio of about 20 vs. current industry cruise at a fan pressure ratio of about 1.35 and engine bypass ratio of about 11. Current engines have a top of climb (for max available thrust) fan pressure ratio of about 1.5.

In one embodiment, the variable pitch fan exit guide vane array 62 are movable (FIG. 4) between a maximum power extraction pitch position 110 for the after-fan system 60 typically utilized at cruise thrust conditions and a minimum power extraction pitch position 112 typically utilized for max climb engine power setting, top of climb, and at take-off thrust conditions as represented by the airflow vectors triangles. The after-fan system 60 permits the fan diameter of the fan section 42 to be sized for cruise thrust conditions which results in one example of an about 6% TSFC advantage. The after-fan system 60 also permits an increase to the max available fan pressure ratio for the top of climb, and at take-off thrust conditions. This provides a decrease in overall engine weight with a reduced diameter to facilitate underwing nacelle installation. In this embodiment, the fan section 42 and the after-fan turbine 74 rotate in the same direction, however, counter-rotating systems may also be provided.

With reference to FIGS. 3 and 4, example ranges of the airflow vector angles in the airflow vectors triangles include:

α0—the airflow local angle at vane leading edge of 30-60 degrees. This angle is the resulting airflow swirl downstream of the fan section 42 at different fan rpm.

α1—the airflow C1 speed vector angle at a trailing edge of the variable pitch fan exit guide vane array 62 of 30-60 degrees. This is the vane exit speed vector that is the resulting airflow turning by the vane airfoils channel.

β1—the airflow local W1 speed vector angle of about 20-50 degrees at the leading edge of the after-fan turbine 74, which is resulting vector in triangle with C1 vector and the U vector which represents the after-fan turbine 74 rotational speed.

β2—the airflow W2 speed vector of about 20-40 degrees at the trailing edge of the after-fan turbine 74 (turbine blades channel exit).

These ranges may vary depending on, for example, turbine blade section arrangements along turbine vane span, after-fan blade geometry, anticipated turbine expansion ratios for the embodiment, turbine rpm, and turbine blade profiles. For this high swirl version fan, the existed high fan airflow swirl create condition to use the swirl to improve variable vane efficiency and design when using contra rotating version. For contra rotating versions, vane and turbine blades profiles will have mirrored arrangement vs. considered in FIGS. 3 and 4 vector triangles. Further, the after-fan turbine blades may have different aerodynamic loading profiles along blades span with a minimum turbine expansion ratio in a root portion of the blade, which faces core flow path.

Figure 5:
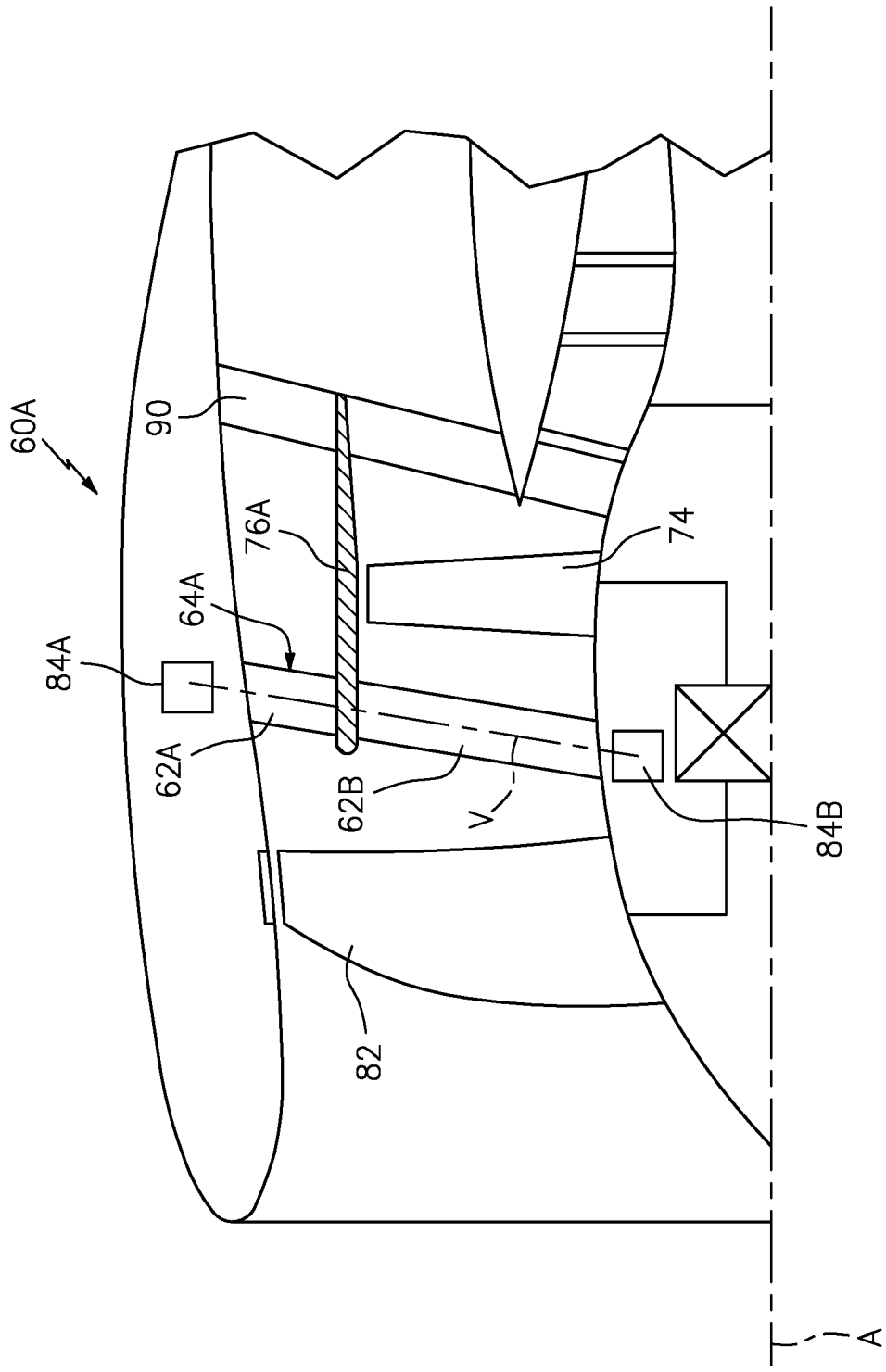
FIG. 5 is a schematic illustration of the high bypass gas turbine engine with an after-fan system with a splitter and a short span after-fan turbine according to another disclosed non-limiting embodiment.

With reference to FIG. 5, another embodiment of the after-fan system 60A includes a variable pitch fan exit guide vane ring 64A upstream of the after-fan turbine 74A. The variable pitch fan exit guide vane ring 64A includes an outer diameter portion 62A of the variable pitch fan exit guide vane ring 64A and an inner diameter portion 62B of the variable pitch fan exit guide vane ring 64A. The outer diameter portion 62A and the inner diameter portion 62B may be independently adjusted in pitch about the common pitch axis V by a respective actuator 84A, 84B. Alternatively, the outer diameter portion 62A or the inner diameter portion 62B may be fixed to at least partially supports the ring splitter 76A. Alternatively, the ring splitter 76A may be partially supported by a strut array 90. In this embodiment, the after-fan turbine 74 is contained within the ring splitter 76A. This enables the portion of the bypass flow B in the outer diameter portion 62A to be adjusted in flow rate and pressure independently of the portion of the bypass flow B in the inner diameter portion 62B in response to engine 20 fuel flow changes that vary engine 20 thrust as between a cruise and climb condition. The short blade span turbine splitter provides advantage for turbine blade tip clearance to facilitate efficiency.

Figure 6:
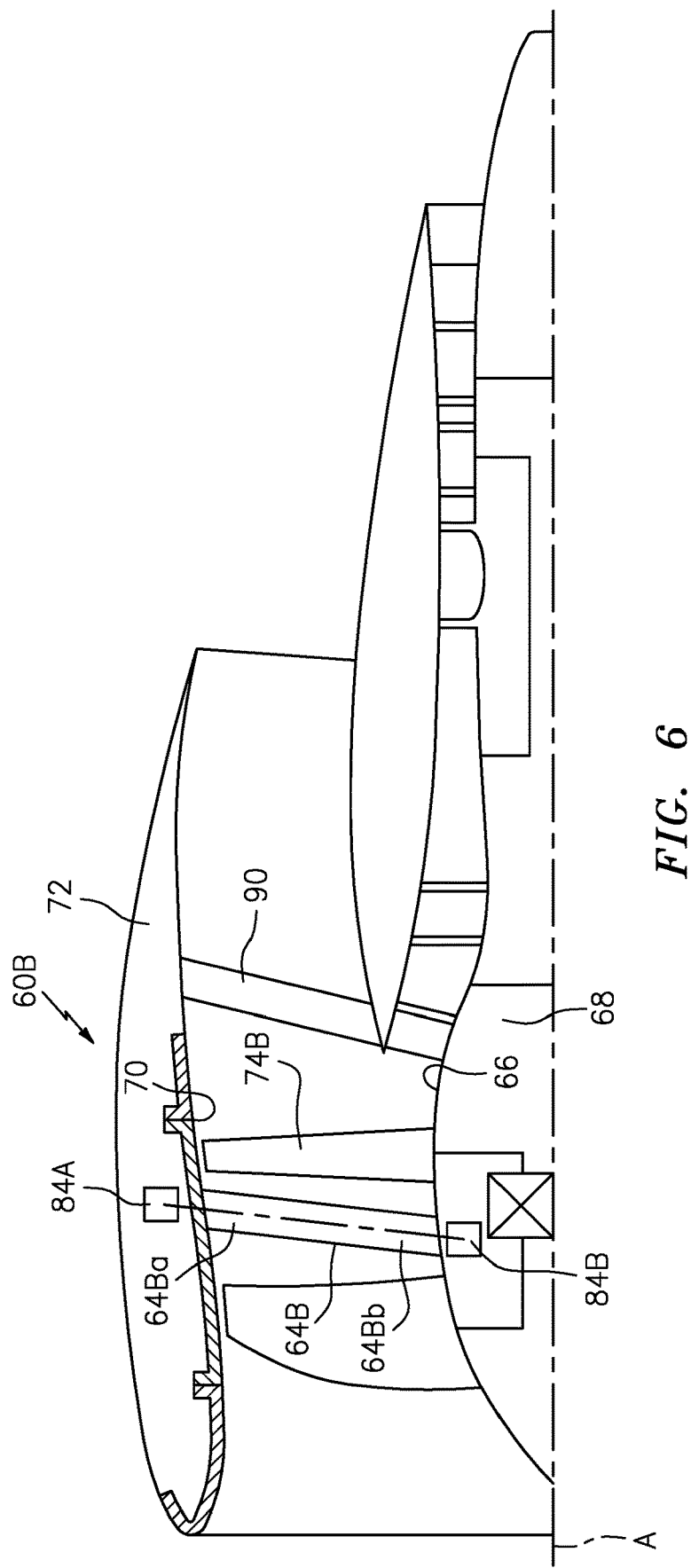
FIG. 6 is a schematic illustration of the high bypass gas turbine engine with an after-fan system with a split full span variable guide vane array according to another disclosed non-limiting embodiment.

With reference to FIG. 6, another embodiment of the after-fan system 60B includes a radially split full span variable pitch fan exit guide vane ring 64B without a splitter upstream of a full span after-fan turbine 74B. The full span after-fan turbine 74B extends between the outer profile 66 of the core static structure 68 and the inner periphery 70 of the fan nacelle 72. The radially split full span variable pitch fan exit guide vane ring 64B includes an outer diameter portion 64Ba and inner diameter portion 64Bb. The radially split full span variable pitch fan exit guide vane ring 64B facilitates control of a fan op-line via the outer diameter portion 64Ba and ensures required turbine power extraction load along turbine span for efficiency via the inner diameter portion 64Bb. The complexity and lack of splitter may require the strut array 90 installation for structural support and force transfer.

Figure 7:
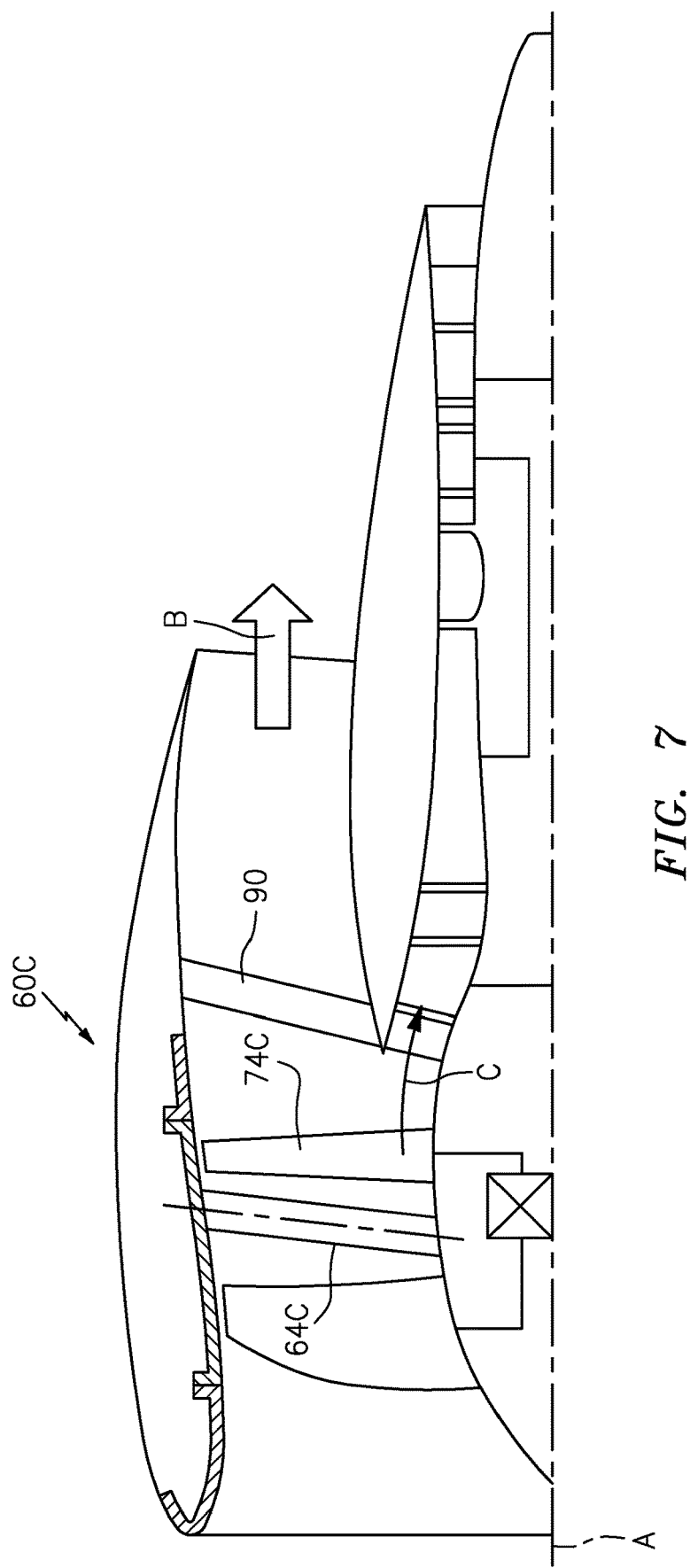
FIG. 7 is a schematic illustration of the high bypass gas turbine engine with a full span after-fan system according to another disclosed non-limiting embodiment.

With reference to FIG. 7, another embodiment of the after-fan system 60C includes a full span variable pitch fan exit guide vane ring 64C upstream of a full span after-fan turbine 74C without a splitter. The lack of splitter may require a strut installation for structural support and force transfer. A full span variable pitch fan exit guide vane ring 64C upstream of a full span after-fan turbine 74C is the configuration for an improved ultra high bypass ratio engine and aircraft that cruise at subsonic flight Mach number, and to insure required turbine power extraction load along full span blade for best efficiency.

Low-Bypass/Variable Cycle

Figure 8:
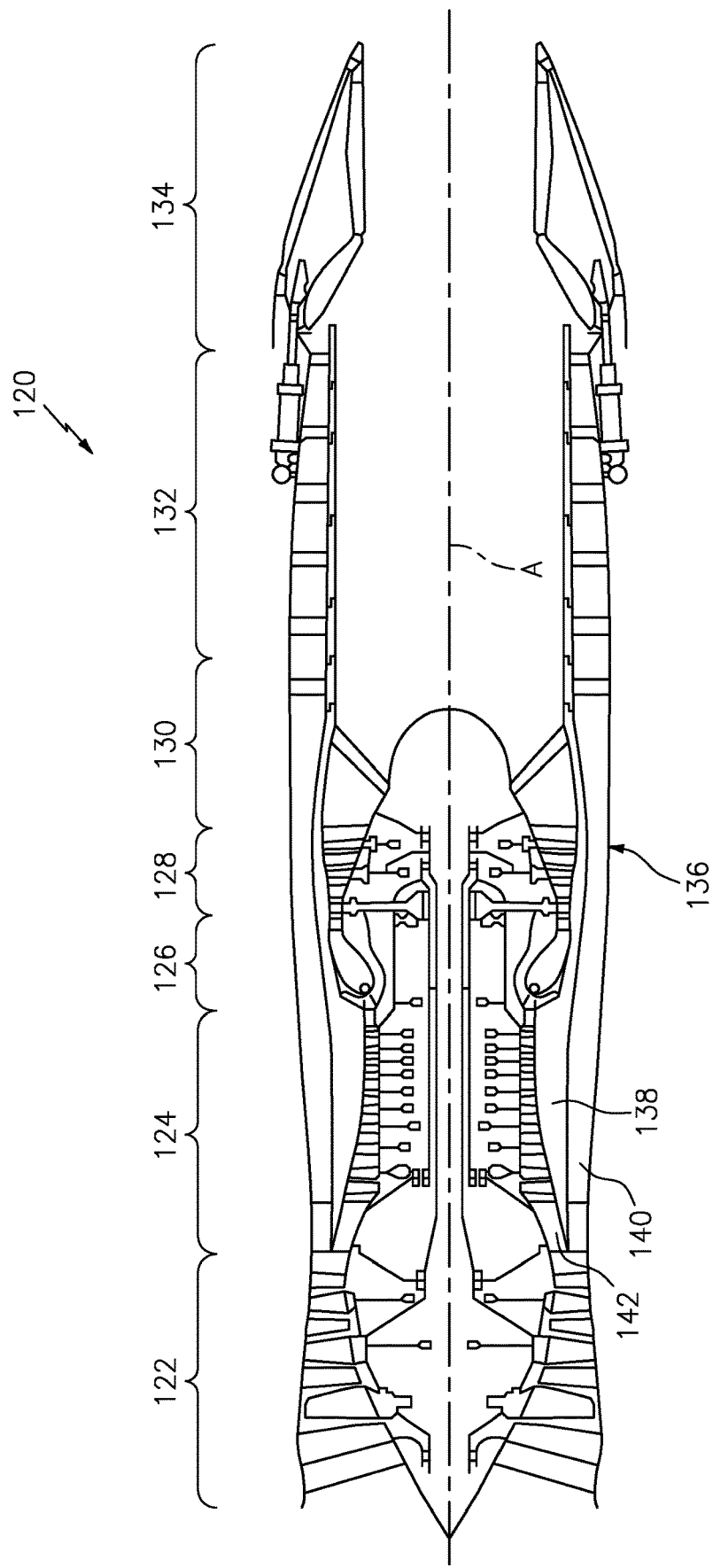
FIG. 8 is a schematic illustration of a low bypass gas turbine engine with an after-fan system according to one disclosed non-limiting embodiment.

With reference to FIG. 8, another embodiment of the after-fan system 60D is utilized with a low-bypass gas turbine engine 120. The gas turbine engine 120 is disclosed herein as a two-spool, low-bypass, augmented turbofan that generally incorporates a fan section 122, a compressor section 124, a combustor section 126, a turbine section 128, an augmenter section 130, a duct section 132, and a nozzle system 134 along a central longitudinal engine axis A. Although generally described and illustrated with regard to a low-bypass gas turbine engine, a variable cycle gas turbine engine that essentially alters a bypass ratio during flight to achieve countervailing objectives such as high specific thrust for high-energy maneuvers yet optimizes fuel efficiency for cruise and loiter operational modes will also benefit herefrom.

An outer case structure 136 and an inner case structure 138 define a generally annular secondary airflow path 140 around a core airflow path 142. Various structures may define the outer case structure 136 and the inner case structure 138 which essentially define an exoskeleton to support rotational hardware therein. Air that enters the fan section 122 is divided between core airflow through the core airflow path 142, and secondary airflow through the secondary airflow path 140. The core airflow passes through the combustor section 126, the turbine section 128, then the augmentor section 130, where fuel may be selectively injected and burned to generate additional thrust through the nozzle system 134.

The secondary airflow may be utilized for a multiple of purposes to include, for example, cooling, pressurization and variable cycle operations. The secondary airflow as defined herein is any airflow different from the core airflow. The secondary airflow may ultimately be at least partially injected into the core airflow path 142 adjacent to the duct section 132 and the nozzle system 134.

Figure 9:
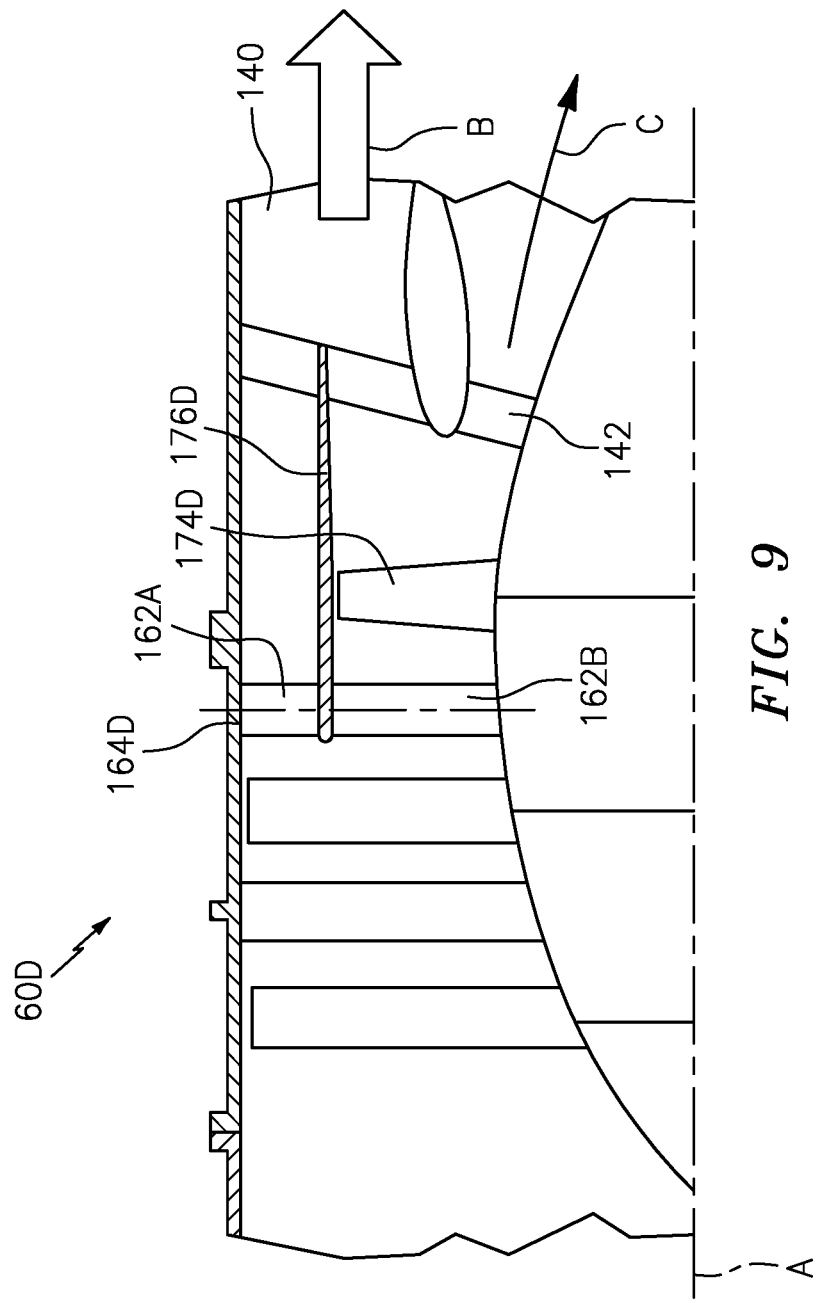
FIG. 9 is a schematic illustration of the low bypass gas turbine engine with an after-fan system with a splitter and a short span after-fan turbine according to another disclosed non-limiting embodiment.

With reference to FIG. 9, in this embodiment, the after-fan system 60D includes a split variable pitch fan exit guide vane ring 164D upstream of an after-fan turbine 174D that is upstream of the secondary airflow path 140 and the core airflow path 142. The split variable pitch fan exit guide vane ring 164D includes a outer diameter portion of the variable pitch fan exit guide 162A and a second vane portion 162B that partially supports the ring splitter 176D. The outer diameter portion of the variable pitch fan exit guide 162A and/or the second vane portion 162B may be individually or collectively varied in pitch to selectively control the airflow to the after-fan turbine 174D within the ring splitter 176D. The ring splitter 176A is located radially intermediate the secondary airflow path 140. Architectures with two portion variable pitch exit guide vanes that facilitate control of turbine power extraction by inner portion airflow vector changes in front of the turbine blade leading edge, and at the same time controls a fan operating line.

Figure 10:
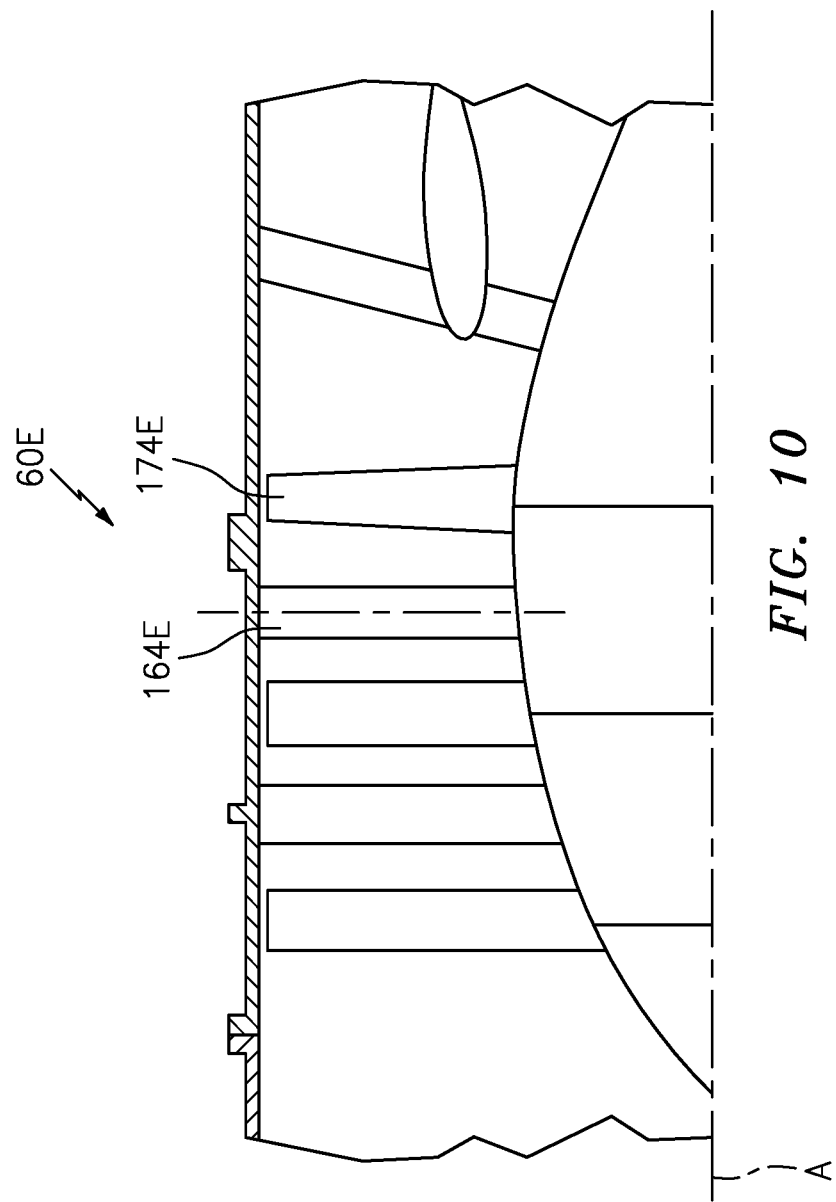
FIG. 10 is a schematic illustration of the low bypass gas turbine engine with a full span after-fan system according to another disclosed non-limiting embodiment.
Figure 11:
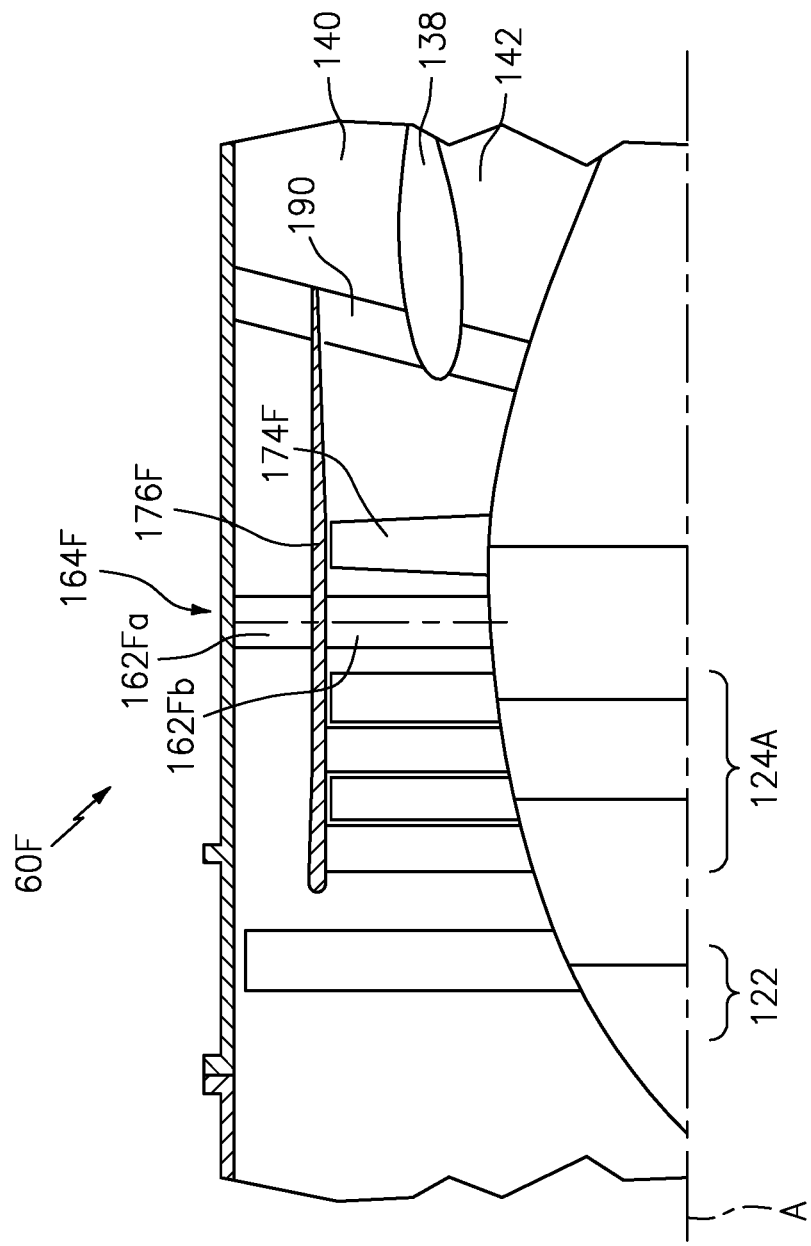
FIG. 11 is a schematic illustration of the low bypass gas turbine engine with an extended splitter and short span after-fan system with a full span variable vane array according to another disclosed non-limiting embodiment.

With reference to FIG. 10, another embodiment of the after-fan system 60E includes an array of full span variable pitch fan exit guide vane ring 164E upstream of the full span after-fan turbine 174E without a splitter. Architectures with full span turbine blades facilitates the distribution of power extraction load along full span blades for best efficiency With reference to FIG. 11, another embodiment of the after-fan system 60F includes a split variable pitch fan exit guide vane ring 164F upstream of a short span after-fan turbine 174F that is upstream of the secondary airflow path 140 and the core airflow path 142. The split variable pitch fan exit guide vane ring 164F includes an outer diameter portion 162Fa and a inner diameter portion 162Fb that partially supports the ring splitter 176F. The outer diameter portion 162Fa and/or the inner diameter portion 162Fb may be individually or collectively varied in pitch to selectively control the airflow to the after-fan turbine 174F within the ring splitter 176F. In this embodiment, the ring splitter 176F is located radially intermediate the secondary airflow path 140 and encompasses a low pressure compressor 124A of the compressor section 124. That is, the fan section 122 and the split variable pitch fan exit guide vane ring 164F extend radially beyond the ring splitter 176F. The ring splitter 176F is also at least partially supported by a strut array 190 which spans the secondary airflow path 140 and the core airflow path 142 to at least partially support the inner case structure 138.

The split variable pitch fan exit guide vane ring 164F permits independent control of the outer diameter portion 162Fa and the second vane portion 162Fb. The outer diameter portion 162Fa facilitates control of the fan operational line for best efficiency and stability margin, and at the inner diameter portion 162Fb facilitates the required power extraction and efficiency for the short span after-fan turbine 174F. The outer diameter portion 162Fa also facilitates a change in an adaptive fan outer airflow to optimized BPR for different flight segments. The axially extended ring splitter 176F facilitates formation of a third stream by splitter extension downstream of the fan duct. Architectures with short span blades facilitates the generation of the third stream by splitter extension downstream of the duct to optimize engine bypass ratio for different flights segments.

Figure 12:
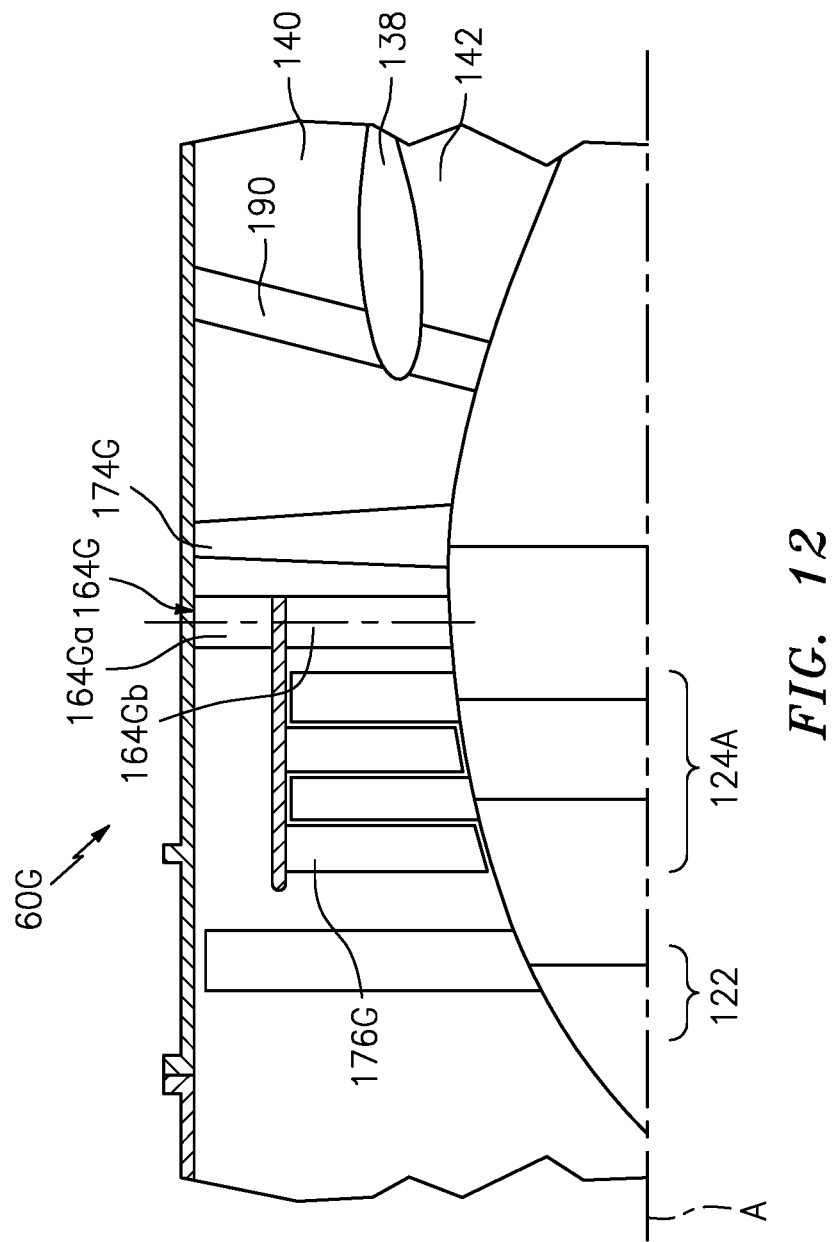
FIG. 12 is a schematic illustration of the low bypass gas turbine engine with a splitter and a full span after-fan system with a full span variable vane array and after-fan turbine downstream of the splitter according to another disclosed non-limiting embodiment.

With reference to FIG. 12, another embodiment of the after-fan system 60G includes a split variable pitch fan exit guide vane ring 164G upstream of a full span after-fan turbine 174G that is upstream of the secondary airflow path 140 and the core airflow path 142. The split variable pitch fan exit guide vane ring 164G includes an outer diameter portion 162Ga and an inner diameter portion 162Gb that partially supports the ring splitter 176G. The outer diameter portion 162Ga and/or the inner diameter portion 162Gb may be individually or collectively varied in pitch to selectively control the airflow to the after-fan turbine 174G aft of the ring splitter 176G. In this embodiment, the ring splitter 176G is located radially intermediate the secondary airflow path 140 and encompasses the low pressure compressor 124A of the compressor section U4. That is, the fan section 122, the split variable pitch fan exit guide vane ring 164G and the after-fan turbine 174G extend radially beyond the ring splitter 176G.

The full span after-fan turbine 174G is arranged downstream of the ring splitter 176G such that operation in combination with the outer diameter portion 162Ga facilitates control of the adaptive fan outer airflow to provide an optimized BPR for different flight segments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. An after-fan system for a gas turbine engine, comprising:
    a variable pitch fan exit guide vane array;
    an after-fan turbine downstream of the variable pitch fan exit guide vane array, wherein the after-f an turbine is configured to extract a portion of energy from a compressed bypass flow from a fan section and return the portion of the energy to the fan section through torque; and
    a control operable to vary a pitch of the variable pitch fan exit guide vane array.

2. The after-fan system as recited in claim 1, wherein the variable pitch fan exit guide vane array comprises a split variable pitch fan exit guide vane array.

3. The after-fan system as recited in claim 2, wherein the split variable pitch fan exit guide vane array includes a first variable pitch fan exit guide vane array and a second variable pitch fan exit guide vane array inboard of the first variable pitch fan exit guide vane array.

4. The after-fan system as recited in claim 3, wherein the first variable pitch fan exit guide vane array and the second variable pitch fan exit guide vane array are independently adjustable in the pitch.

5. The after-fan system as recited in claim 4, wherein the first variable pitch fan exit guide vane array and the second variable pitch fan exit guide vane array are separated by a splitter.

6. The after-fan system as recited in claim 5, wherein the after-fan turbine is located within the splitter.

7. The after-fan system as recited in claim 5, wherein the after-fan turbine is located downstream of the splitter.

8. The after-fan system as recited in claim 1, wherein the variable pitch fan exit guide vane array is downstream of the fan section.

9. The after-fan system as recited in claim 1, wherein the variable pitch fan exit guide vane array is downstream of a low pressure compressor section.

10. A gas turbine engine, comprising:
    a fan section with an array of fan blades;
    a variable pitch fan exit guide vane array downstream of the fan section; and
    a short span after-fan turbine downstream of the variable pitch fan exit guide vane array, said short span after-fan turbine being positioned between an outer profile of a core static structure and a ring splitter located radially inboard of an inner periphery of a fan nacelle, the short span after-fan turbine being contained radially within the ring splitter, wherein the short span after-fan turbine is configured to extract a portion of energy from a compressed bypass flow from the fan section and return the portion of the energy to the fan section through torque.

11. The gas turbine engine as recited in claim 10, wherein the variable pitch fan exit guide vane array is downstream of a low pressure compressor section which is downstream of the fan section.

12. The gas turbine engine as recited in claim 10, wherein the short span after-fan turbine is driven in concert with the fan section.

13. The gas turbine engine as recited in claim 10, wherein the short span after-fan turbine is driven by a geared architecture which also drives the fan section.

14. The gas turbine engine as recited in claim 10, wherein the gas turbine engine is a high bypass gas turbine engine.

15. The gas turbine engine as recited in claim 10, wherein the gas turbine engine is a low bypass gas turbine engine.

16. The gas turbine engine as recited in claim 15, wherein the low bypass gas turbine engine is variable cycle.

17. A method of generating thrust fora gas turbine engine, comprising:
    rotating a fan section with an array of fan blades;
    rotating a short span after-fan turbine downstream of the fan section, said short span after-fan turbine being positioned between an outer profile of a core static structure and a ring splitter located radially inboard of an inner periphery of a fan nacelle, the short span after-fan turbine being contained radially within the ring splitter, wherein the short span after-fan turbine extracts a portion of energy from a compressed bypass flow from the fan section and return the portion of the energy to the fan section through torque; and varying a pitch of a variable pitch fan exit guide vane array downstream of the fan section and upstream of the short span after-fan turbine.

18. The method as recited in claim 17, further comprising locating the variable pitch fan exit guide vane array and the short span after-fan turbine downstream of a low pressure compressor section.

19. The method as recited in claim 17, wherein said varying the pitch of the variable pitch fan exit guide vane array comprises independently varying a pitch of an outer diameter section of the variable pitch fan exit guide vane array and an inner diameter section of the variable pitch fan exit guide vane array.

20. The method as recited in claim 17, further comprising locating the ring splitter between an outer diameter section of the variable pitch fan exit guide vane array and an inner diameter section of the variable pitch fan exit guide vane array.

\* \* \* \* \*